(12) United States Patent
Sainath et al.

(10) Patent No.: US 10,832,536 B2
(45) Date of Patent: Nov. 10, 2020

(54) GUIDED CABLE MANAGEMENT

(71) Applicant: INTERNATIONAL BUSINESS MACHINES CORPORATION, Armonk, NY (US)

(72) Inventors: Venkatesh Sainath, Bangalore (IN); Jinu Joy Thomas, Bangalore (IN); Daniel E. Hurlimann, Austin, TX (US); Thomas Sand, Rochester, MN (US); Fernando Pizzano, Poughkeepsie, NY (US); Victor Garibay, Leander, TX (US); Chetan Mehta, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/213,121

(22) Filed: Dec. 7, 2018

(65) Prior Publication Data
US 2020/0184784 A1 Jun. 11, 2020

(51) Int. Cl.
*G08B 21/00* (2006.01)
*G08B 5/22* (2006.01)
(Continued)

(52) U.S. Cl.
CPC .............. *G08B 5/22* (2013.01); *H04L 43/14* (2013.01); *H04Q 1/141* (2013.01)

(58) Field of Classification Search
CPC .......... G08B 5/22; H04L 43/14; H04Q 1/141
(Continued)

(56) References Cited

U.S. PATENT DOCUMENTS

| 4,985,855 A | 1/1991 | Aldrich et al. |
| 5,409,123 A | 4/1995 | Steiner |

(Continued)

FOREIGN PATENT DOCUMENTS

| CN | 101802799 | 7/2012 |
| EP | 1855134 | 11/2007 |

(Continued)

OTHER PUBLICATIONS

Pandya, Network Structure or Topology, International Journal of Advance Research in Computer Science and Management Studies, IJARCSMS, Jul. 2013, pp. 22-27, vol. 1, Issue 2.
(Continued)

*Primary Examiner* — Naomi J Small
(74) *Attorney, Agent, or Firm* — Kunzler Bean & Adamson; Bruce R. Needham (57) ABSTRACT

Apparatuses, methods, program products, and systems are presented for guided cable management. An apparatus includes a cable module that detects a first end of a cable installed at a port of a first node, a first port module that determines whether the cable that is installed at the port is an expected cable for the port based on a cable mapping table, and a first indicator module that triggers a visual indicator at the port to visually confirm that the cable is the expected cable for the port. The apparatus includes a second port module that determines a port of a second node where a second end of the cable is expected to be installed and a second indicator module that triggers a visual indicator at the port to visually indicate that the second end of the cable is expected to be installed in the port.

20 Claims, 5 Drawing Sheets

(51) Int. Cl.
*H04L 12/26* (2006.01)
*H04Q 1/14* (2006.01)

(58) Field of Classification Search
USPC ..................................................... 340/686.1
See application file for complete search history.

(56) References Cited

U.S. PATENT DOCUMENTS

| | | | |
|---|---|---|---|
| 6,517,052 B1 | 2/2003 | Lake | |
| 6,640,272 B1 | 10/2003 | Hartwell et al. | |
| 7,294,786 B2 | 11/2007 | Aldereguia et al. | |
| 8,118,282 B2 | 2/2012 | Griffioen et al. | |
| 8,341,838 B2 | 1/2013 | Low | |
| 8,994,547 B2 | 3/2015 | German | |
| 9,426,032 B2 | 8/2016 | Caveney et al. | |
| 2002/0122652 A1 | 9/2002 | Gonzalez et al. | |
| 2004/0061486 A1 | 4/2004 | Peeke et al. | |
| 2007/0195711 A1* | 8/2007 | Morris | H04L 41/082 370/254 |
| 2008/0049790 A1 | 2/2008 | Caveney | |
| 2011/0127475 A1 | 6/2011 | Ballard | |
| 2012/0185624 A1* | 7/2012 | Dang | G06F 13/40 710/104 |
| 2016/0098336 A1* | 4/2016 | Loebig | G06F 13/10 710/16 |
| 2016/0373839 A1 | 12/2016 | Caveney et al. | |
| 2018/0139630 A1 | 5/2018 | Iun et al. | |
| 2018/0238967 A1* | 8/2018 | Jochum | G01R 31/3272 |
| 2019/0057056 A1* | 2/2019 | Chen | G06F 3/0604 |

FOREIGN PATENT DOCUMENTS

| | | |
|---|---|---|
| RU | 2667712 | 9/2018 |
| WO | 2015023768 | 2/2015 |
| WO | 2016170398 | 10/2016 |
| WO | 2018009601 | 1/2018 |

OTHER PUBLICATIONS

Power Systems: SMP Cable, IBM Corp., 2014, 14pgs.
Lin et al., Planning Effective Power and Data Cable Management in IT Racks, Schneider Electric—Data Center Science Center, 2015, pp. 1-13.

* cited by examiner

GUIDED CABLE MANAGEMENT

FIELD

The subject matter disclosed herein relates to installing cables between devices and more particularly relates to providing visual guidance and direction for cable installation.

BACKGROUND

Systems that include multiple enclosures, such as symmetric multi-processing systems, require multiple different cables to connect the enclosures so that the enclosures can communicate with each other. However, as the number of cables increases, it can be difficult to visually determine where the cables need to be installed, which can cause errors in the cabling of the enclosures and can be time-consuming to validate the cable configuration.

SUMMARY

An apparatus for guided cable management is disclosed. A computer-implemented method and computer program product also perform the functions of the apparatus. According to an embodiment of the present invention, an apparatus includes a cable module that detects a first end of a cable installed at a port of a first node. The first end of the cable may store metadata for the cable. In further embodiments, the apparatus includes a first port module that determines whether the cable that is installed at the port of the first node is an expected cable for the port of the first node based on a cable mapping table. The cable metadata may be used to reference the cable mapping table.

The apparatus, in certain embodiments, includes a first indicator module that, in response to determining the cable is the expected cable at the port of the first node, triggers a visual indicator at the port of the first node to visually confirm that the cable is the expected cable for the port of the first node. In various embodiments, the apparatus includes a second port module that determines a port of a second node where a second end of the cable is expected to be installed based on the cable mapping table. In some embodiments, the apparatus includes a second indicator module that triggers a visual indicator at the port of the second node to visually indicate that the second end of the cable is expected to be installed in the port of the second node.

A method for guided cable management is disclosed. In one embodiment, the method includes detecting a first end of a cable installed at a port of a first node. The first end of the cable may store metadata for the cable. In further embodiments, the method includes determining whether the cable that is installed at the port of the first node is an expected cable for the port of the first node based on a cable mapping table. The cable metadata may be used to reference the cable mapping table.

The method, in certain embodiments, includes, in response to determining the cable is the expected cable at the port of the first node, triggering a visual indicator at the port of the first node to visually confirm that the cable is the expected cable for the port of the first node. In various embodiments, the method includes determining a port of a second node where a second end of the cable is expected to be installed based on the cable mapping table. In some embodiments, the method includes triggering a visual indicator at the port of the second node to visually indicate that the second end of the cable is expected to be installed in the port of the second node.

In one embodiment, a computer program product includes a computer readable storage medium having program instructions embodied therewith. The program instructions, in one embodiment, are executable by a processor to cause the processor to detect, by processor, a first end of a cable installed at a port of a first node. The first end of the cable may store metadata for the cable. In further embodiments, the program instructions are executable by the processor to cause the processor to determine whether the cable that is installed at the port of the first node is an expected cable for the port of the first node based on a cable mapping table. The cable metadata may be used to reference the cable mapping table.

In some embodiments, the program instructions are executable by the processor to cause the processor to, in response to determining the cable is the expected cable at the port of the first node, trigger a visual indicator at the port of the first node to visually confirm that the cable is the expected cable for the port of the first node. In various embodiments, the program instructions are executable by the processor to cause the processor to determine a port of a second node where a second end of the cable is expected to be installed based on the cable mapping table. In one embodiment, the program instructions are executable by the processor to cause the processor to trigger a visual indicator at the port of the second node to visually indicate that the second end of the cable is expected to be installed in the port of the second node.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

An apparatus for guided cable management is disclosed. A computer-implemented method and computer program product also perform the functions of the apparatus. According to an embodiment of the present invention, an apparatus includes a cable module that detects a first end of a cable installed at a port of a first node. The first end of the cable may store metadata for the cable. In further embodiments, the apparatus includes a first port module that determines whether the cable that is installed at the port of the first node is an expected cable for the port of the first node based on a cable mapping table. The cable metadata may be used to reference the cable mapping table.

The apparatus, in certain embodiments, includes a first indicator module that, in response to determining the cable is the expected cable at the port of the first node, triggers a visual indicator at the port of the first node to visually confirm that the cable is the expected cable for the port of the first node. In various embodiments, the apparatus includes a second port module that determines a port of a second node where a second end of the cable is expected to be installed based on the cable mapping table. In some embodiments, the apparatus includes a second indicator module that triggers a visual indicator at the port of the second node to visually indicate that the second end of the cable is expected to be installed in the port of the second node.

In one embodiment, the apparatus includes an order module that determines an order for installing cables in ports of a first node based on the cable mapping table. The cable mapping table may further define a cable installation order for one or more ports of the first node. In further embodiments, the apparatus includes a port iteration module that iterates over each port in the cable mapping table for the first node to determine whether a cable is installed at each port. In some embodiments, in response to determining a port of the first node does not have a connected cable, the first indicator module triggers a visual indicator at the port of the first node to indicate installation of a first end of a cable at the port of the first node and the second indicator module triggers a visual indicator at a corresponding port of a second node to indicate installation of a second end of the cable at the port of the second node.

In one embodiment, the second indicator module triggers the visual indicator at the port of the second node in response to detecting the first end of the cable is installed at the first port of the first node. In certain embodiments, the apparatus includes a cable removal module that initially scans each port of the first node and the second node to determine if any cables are incorrectly installed in an unexpected port according to the cable mapping table, provides a visual indicator at the port of a node where an end of the cable is incorrectly installed to indicate removal of the end of the cable from the port, and clears the visual indicator at the port in response to removal of the end of the cable from the port.

In one embodiment, the cable mapping table is predefined based on architectures of the first and second nodes. The cable mapping table may be stored in firmware of one or more of the first and second nodes. In some embodiments, the apparatus includes a configuration module that dynamically generates the cable mapping table by, for each corresponding port of the first and second nodes, detecting a first end of a cable installed in a port of the first node and a second end of the cable installed in a port of the second node and creating an entry in the cable mapping table that includes a mapping of the port of the first node to the port of the second node and metadata for the cable used to connect the port of the first node to the port of the second node.

In various embodiments, the configuration module further tracks and stores, in the cable mapping table, an order that each cable is installed between the port of the first node and the port of the second node. In certain embodiments, the configuration module, while the cable mapping table is generated, further detects that an end of a previously-recorded cable mapping is removed from one of the port of the first node and the port of the second node and removes the entry for the cable, the port of the first node, and the port of the second node from the cable mapping table.

In one embodiment, the first indicator module triggers a visual indicator at the port of the first node to indicate that the first end of the cable is not expected to be installed in the port of the first node according to the cable mapping table in response to the first end of the cable being installed in the port of the first node. In some embodiments, the second indicator module triggers a visual indicator at the port of the second node to indicate that the second end of the cable is not expected to be installed in the port of the second node according to the cable mapping table in response to the second end of the cable being installed in the port of the second node.

In one embodiment, in response to determining that the first end of the cable is not expected to be installed in the port of the first node, the first indicator module triggers a visual indicator at a different port of the first node where the first end of the cable is expected to be installed. In further embodiments, in response to determining that the second end of the cable is not expected to be installed in the port of the second node, the second indicator module triggers a visual indicator at a different port of the second node where the second end of the cable is expected to be installed.

In one embodiment, the first indicator module triggers a visual indicator at the port of the first node to indicate that the first end of the cable is not expected to be installed in the port of the first node according to the cable mapping table in response to the first end of the cable being installed in the port of the first node. In various embodiments, the second indicator module triggers a visual indicator at the port of the second node to indicate that the second end of the cable is not expected to be installed in the port of the second node according to the cable mapping table in response to the second end of the cable being installed in the port of the second node.

In one embodiment, in response to determining that the first end of the cable is not expected to be installed in the port of the first node, the first indicator module triggers a visual indicator at a different port of the first node where the first end of the cable is expected to be installed. In some embodiments, in response to determining that the second end of the cable is not expected to be installed in the port of the second node, the second indicator module triggers a visual indicator at a different port of the second node where the second end of the cable is expected to be installed.

In one embodiment, the cable module is configured to detect cables installed in ports of the first node and ports of the second node one or more of in response to an interrupt, at startup of the first and second nodes, and in response to a user manually starting cable detection using an interface for the first and second nodes. In various embodiments, the visual indicator includes a light associated with a port, the light configured to one or more of blink at a predefined rate, stay on for a predetermined period of time, turn off, and emit a predefined color according to whether an end of the cable is installed in an expected port of the first and second nodes.

In one embodiment, the cable includes a symmetric multi-processing ("SMP") cable and the ports of the first and second nodes include symmetric multi-processing ports. The SMP cable may be used to connect the first node to the second node to facilitate communications between different processors of the first and second nodes. In certain embodiments, the cable metadata includes vital product data ("VPD") for the cable. The VPD may include one or more of a cable identifier, a cable length, and a cable type.

A method for guided cable management is disclosed. In one embodiment, the method includes detecting a first end of a cable installed at a port of a first node. The first end of the cable may store metadata for the cable. In further embodiments, the method includes determining whether the cable that is installed at the port of the first node is an expected cable for the port of the first node based on a cable mapping table. The cable metadata may be used to reference the cable mapping table.

The method, in certain embodiments, includes, in response to determining the cable is the expected cable at the port of the first node, triggering a visual indicator at the port of the first node to visually confirm that the cable is the expected cable for the port of the first node. In various embodiments, the method includes determining a port of a second node where a second end of the cable is expected to be installed based on the cable mapping table. In some embodiments, the method includes triggering a visual indicator at the port of the second node to visually indicate that the second end of the cable is expected to be installed in the port of the second node.

The method, in one embodiment, includes determining an order for installing cables in ports of a first node based on the cable mapping table. The cable mapping table may further define a cable installation order for one or more ports of the first node. In further embodiments, the method includes iterating over each port in the cable mapping table for the first node to determine whether a cable is installed at each port.

In some embodiments, in response to determining a port of the first node does not have a connected cable, the method includes triggering a visual indicator at the port of the first node to indicate installation of a first end of a cable at the port of the first node and triggering a visual indicator at a corresponding port of a second node to indicate installation of a second end of the cable at the port of the second node.

In one embodiment, the method includes triggering the visual indicator at the port of the second node in response to detecting the first end of the cable is installed at the first port of the first node. In certain embodiments, the method includes initially scanning each port of the first node and the second node to determine if any cables are incorrectly installed in an unexpected port according to the cable mapping table, providing a visual indicator at the port of a node where an end of the cable is incorrectly installed to indicate removal of the end of the cable from the port, and clearing the visual indicator at the port in response to removal of the end of the cable from the port.

In some embodiments, the method includes dynamically generating the cable mapping table by, for each corresponding port of the first and second nodes, detecting a first end of a cable installed in a port of the first node and a second end of the cable installed in a port of the second node and creating an entry in the cable mapping table that includes a mapping of the port of the first node to the port of the second node and metadata for the cable used to connect the port of the first node to the port of the second node.

In one embodiment, a computer program product includes a computer readable storage medium having program instructions embodied therewith. The program instructions, in one embodiment, are executable by a processor to cause the processor to detect, by processor, a first end of a cable installed at a port of a first node. The first end of the cable may store metadata for the cable. In further embodiments, the program instructions are executable by the processor to cause the processor to determine whether the cable that is installed at the port of the first node is an expected cable for the port of the first node based on a cable mapping table. The cable metadata may be used to reference the cable mapping table.

In some embodiments, the program instructions are executable by the processor to cause the processor to, in response to determining the cable is the expected cable at the port of the first node, trigger a visual indicator at the port of the first node to visually confirm that the cable is the expected cable for the port of the first node. In various embodiments, the program instructions are executable by the processor to cause the processor to determine a port of a second node where a second end of the cable is expected to be installed based on the cable mapping table. In one embodiment, the program instructions are executable by the processor to cause the processor to trigger a visual indicator at the port of the second node to visually indicate that the second end of the cable is expected to be installed in the port of the second node.

Figure 1:
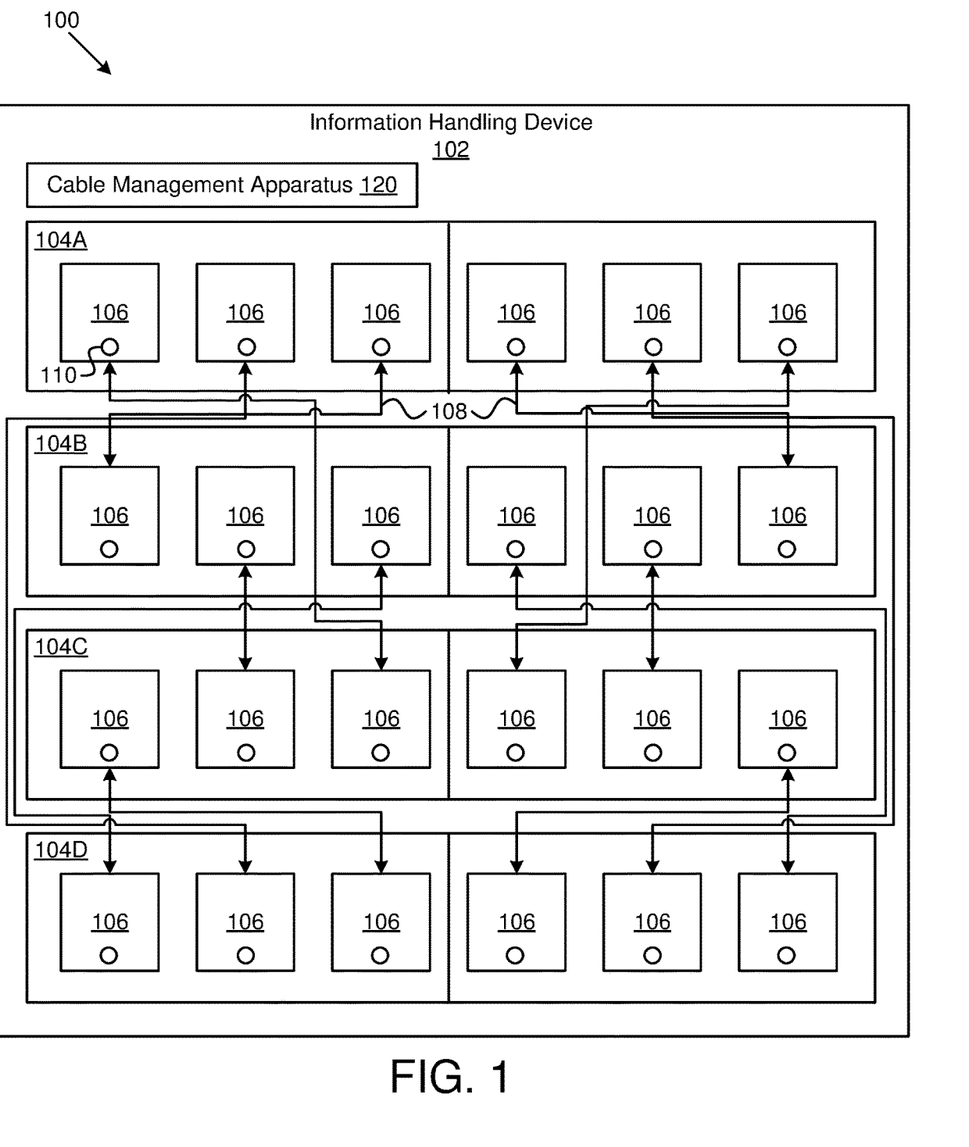
FIG. 1 is a schematic block diagram illustrating one embodiment of a system for guided cable management.

FIG. 1 is a schematic block diagram illustrating one embodiment of a system 100 for guided cable management. In one embodiment, system 100 includes an information handling device 102. The information handling device 102 may be a power system (e.g., based on IBM's Power architecture) that includes multiple racks/enclosures 104A-D (collectively "104") that include multiple different nodes 106. Each node 106 may include one or more processing units, processors, processor cores, virtual processors, graphics processors, and/or the like. Together, the nodes 106 may be configured for symmetric multiprocessing ("SMP"). As used herein, SMP may refer to the processing of programs, applications, functions, or the like by multiple processing units that may share a common operating system and memory. In symmetric (or "tightly coupled") multiprocessing, the processors share memory and the input/output bus or data path. A single copy of the operating system may be in charge of all the processing units within the nodes 106.

In such an embodiment, nodes 106 may be communicatively coupled to one another using data cables such as SMP processor cables 108, which facilitate communications between different nodes 106, or more specifically, processing units within each node 106. SMP cables 108 may include different link types, such as O-bus links, A-bus links, or the like). SMP cables 108 may include vital product data ("VPD") stored on a ROM (e.g., an Electrically Erasable Programmable Read-Only Memory ("EEPROM"), a serial EEPROM ("SEEPROM"), or the like) or other non-volatile storage that describes various characteristics of the cable 108 such as the serial number, the model number, the version number, the length, the link type, and/or the like. The VPD may be stored in an enclosure at one or more ends of the cable 108 so that the VPD is accessible when the cable 108 is plugged into a port of a node 106.

There may be various configurations for the SMP and the SMP cables 108. In one example, in an IBM® POWER8® 4-enclosure system, there may be 12 different SMP cables 108, and on an IBM POWER9® 4-enclosure system, there may be 48 SMP cables 108. On a correctly cabled POWER8® server, in another embodiment, each enclosure 104 has six ports and six SMP cables 108 connected to the enclosures 104. For a POWER9® server system, there may be 32 ports and 24 SMP cables 108. In certain POWER9® systems, for example, there can be 2-, 3-, or 4-enclosure configurations that each have incrementally more SMP cables 108. There may also be a 2-enclosure high-bandwidth configuration where each processor in a node 106 has multiple connections to its peer nodes 106 on other enclosures 104. There may also be a flat-8 SMP configuration where each processor in a node 106 is connected to every other processor in the system 100 (a.k.a. single-hop configuration). In a manufacturing environment, there may be a configuration where the SMP cables 108 are wrapped within an enclosure for self-test procedures.

In certain embodiments, the SMP cables 108 need to be installed in a predefined, preconfigured, or predetermined configuration, order, or the like. In conventional systems, a user such as a service engineer may use printed documentation for the respective enclosure 104 and node 106 model and system configuration that depicts the cable topology/configuration to install the SMP cables 108 between the various nodes 106. However, this creates a scenario for introducing errors such as missing cable connections, misplugging cables 108 (e.g., plugging cables into the wrong ports), using the wrong cables 108 (wrong cable version/type, wrong cable length), and/or the like.

Furthermore, when SMP cables 108 are connected, the service engineer may trigger a cable topology validation check, e.g., using a program or website script to trigger a cable validation check and identify cabling errors. If cabling errors are present, the service engineer has to remove and reconnect SMP cables 108, and run the verification check again, until all the SMP cables 108 are wired correctly. There is no feedback provided during the cabling process to let the service engineer know whether an SMP cable 108 is connected to the correct or expected port or is not connected to the correct or expected port.

There may be various situations that require the removal and connection of SMP cables 108. For instance, when a new enclosure 104 is added to the system 100 or when an enclosure 104 is removed for service or maintenance, SMP cables 108 may need to be connected, disconnected, or reconnected so that the system 100 can continue to function. Due to the various configurations and the numbers of SMP cables 108 connecting the various nodes 106 across the different enclosures 104, it may be difficult for a service engineer to visually see the ports where the SMP cables 108 need to be connected or ports where the SMP cables 108 need to be removed. Even if SMP cables 108 include labels, the number of cables 108, the location of the system 100, the enclosure configuration, or the like may make it difficult to see the labels.

The cable management apparatus 120 improves upon conventional cabling and cable verification processes described above by providing visual direction and/or feedback during the cabling process. The cable management apparatus 120, in one embodiment, detects a first end of a cable 108 installed at a port of a first node 106 and determines whether the cable 108 is the expected cable 108 for the port of the first node 106 using VPD data from the cable 108 to reference a cable mapping table. If so, the cable management apparatus 120 triggers a visual indicator 110 at the port of the first node 106 and then triggers a visual indicator at a port of a second node 106 where the other end of the cable 108 is expected to be connected. The visual indicator 110 may include a light e.g., a light emitting diode ("LED") that stays on for a period of time, that blinks at a predetermined rate, that emits a predefined color, or the like. In this manner, the cable management apparatus 120 may provide instant and dynamic direction or feedback during the cabling process without requiring a user to install all of the cables 108 and then run a verification tool to determine if the user's cabling is correct or not.

In various embodiments, the cable management apparatus 120 may be embodied as a hardware appliance that can be installed or deployed on an information handling device 102, on a server 108, or elsewhere on the data network 106. In certain embodiments, the cable management apparatus 120 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi™, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the cable management apparatus 120 may include a power interface, a wired and/or wireless network interface, a graphical interface that attaches to a display, and/or a semiconductor integrated circuit device as described below, configured to perform the functions described herein with regard to the cable management apparatus 120.

The cable management apparatus 120, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the cable management apparatus 120 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the cable management apparatus 120.

The semiconductor integrated circuit device or other hardware appliance of the cable management apparatus 120, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the cable management apparatus 120 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

Figure 2:
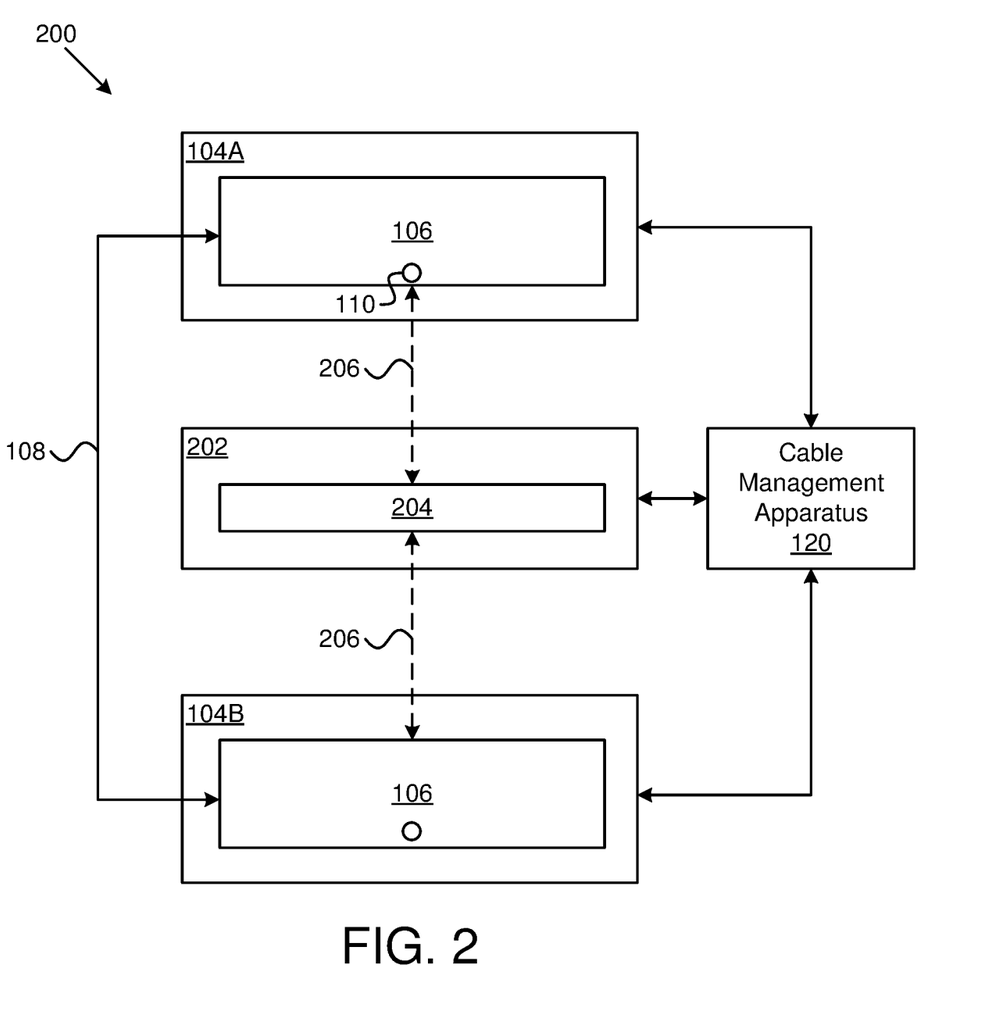
FIG. 2 is a schematic block diagram illustrating one embodiment of another system for guided cable management.

FIG. 2 is a schematic block diagram illustrating one embodiment of another system 200 for guided cable management. The system 200 may be a subset of the system 100 depicted above with reference to FIG. 1, including two enclosures 104A-B, two nodes 106, and an SMP cable 108 connecting the nodes 106. The system 200, in one embodiment, depicts the configuration for transmitting and receiving input/output interrupts when an SMP cable 108 is connected or removed from a node 106, and for triggering visual indicators 110 at the ports where a cable 108 is expected to be installed.

For instance, in one embodiment, when the system 200 is powered-on or starts up, the cable management apparatus 120 may trigger or signal a service processor 204, such as a flexible service processor of an intermediate device 202 within the system 200 to check, scan, or the like the ports of the nodes 106 to determine the current cable topology. The cable management apparatus 120 may compare the current cable topology with a predefined cable mapping table, described in more detail below, for the system configuration. The cable management apparatus 120 may check, in a predetermined order, each port and visually confirm using the visual indicator 110 whether a cable 108 is connected to the correct port or not (e.g., by checking the VPD for the cable 108 with information in the cable mapping table). If not, the cable management apparatus 120 may signal the service processor 204 to activate the visual indicator 110 for the correct port at each of the nodes 106, using a communication bus 206 between the service processor 204 and the nodes 106, to indicate where the ends of the cable 108 need to be installed. The cable management apparatus 120 may go through each of the ports in a predetermined order (e.g., according to the cable mapping table) to provide visual indicators for the ports where the next cable 108 is expected to be connected or installed.

In another embodiment, when an SMP cable 108 is connected to a node 106, the service processor 204 may receive an I/O interrupt that indicates a new cable 108 has been connected to a node 106. For example, the system may include one or more PC9554/5 IO expanders, PIC16F882 expanders, or the like for the cables 108 and consolidate interrupts from multiple cables 108 into a general-purpose input/output expander ("GPIO") and through a flexible support interface ("FSI") bus connected between the service processor 204 and a common field replaceable unit access macro ("CFAM") slave engine.

The cable management apparatus 120 may compare the VPD from the cable 108 with the cable mapping table to determine if the cable 108 is connected to the correct or expected port for the node 106. If so, then the cable management apparatus 120 may trigger the service processor 204 to trigger a visual indicator 110 on the port of the node 106 where the other end of the cable 108 is to be connected. When the cable 108 is connected to the other port, the service processor 204 may receive another interrupt with VPD for the cable 108 and may determine whether the VPD corresponds to an expected cable 108 for the port. If so, the cable management apparatus 120 may trigger a visual indication at both ports that the cable is installed correctly. Otherwise, the cable management apparatus 120 triggers the service processor 204 to provide a visual indicator 110 that the port is the incorrect port for the cable 108 and/or provide a visual indicator 110 at the correct port where the cable 108 is expected to be installed.

Figure 3:
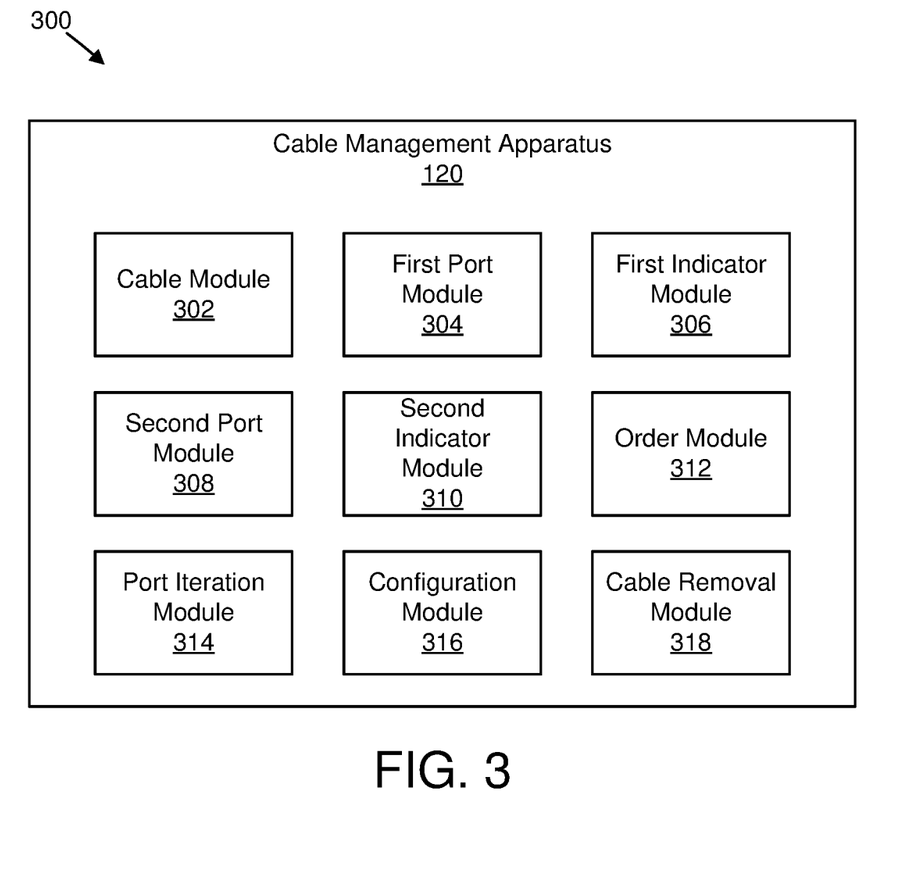
FIG. 3 is a schematic block diagram illustrating one embodiment of an apparatus for guided cable management.

FIG. 3 is a schematic block diagram illustrating one embodiment of an apparatus 300 for guided cable management. The apparatus 300 includes an instance of a cable management apparatus 120. The cable management apparatus 120 includes a cable module 302, a first port module 304, a first indicator module 306, a second port module 308, a second indicator module 310, an order module 312, a port iteration module 314, a configuration module 316, and a cable removal module 318, which are described in more detail below.

In one embodiment, the cable module 302 is configured to detect a first end of a cable (e.g., an SMP cable) 108 installed at a port of a first node 106. The cable module 302, for instance, may receive a signal, interrupt, trigger, message, or the like (e.g., from the service processor 204), may poll a node 106 or a service processor 204 for new cable connections, and/or the like, that indicates a cable 108 has been installed or connected at the port of the first node 106. As described above, the cable 108 may include a chip (e.g., an SEEPROM chip), ROM, or other non-volatile storage device (e.g., located in an enclosure at an end of the cable 108) that includes metadata such as vital product data ("VPD") for the cable. The VPD may include a cable identifier (e.g., a serial number, version number, model number, or the like), a cable length, a cable type, and/or the like.

In one embodiment, the cable module 302 is configured to detect cables 108 installed in ports of a first node 106 at startup of the first node 106. For instance, when the first node 106 is powered on, activated, or the like, the cable module 302 may scan the ports of the first node 106 to determine the cable configuration for the node 106. In further embodiments, the cable module 302 detects cables 108 connected to the first node 106 in response to a user manually starting a cable detection program, application, function, mode, or the like using an interface (e.g., a command line interface, a graphical user interface, a web interface, or the like).

In one embodiment, the first port module 304 is configured to determine whether the cable 108 that is installed at the port of the first node 106 is an expected cable 108 for the port of the first node 106 based on a cable mapping table. As used herein, the cable mapping table may include a table, list, database, or other data structure that includes entries for each port of each node 106 and one or more cables 108 that are expected or allowed to be connected to or installed at the ports. Thus, in one embodiment, the first port module 304 uses the cable metadata (e.g., the cable VPD) to reference the cable mapping table. For instance, the cable identifier may be used as an index or key into the cable mapping table to determine the port where the cable 108 is expected to be installed. In another example, the port number may be used as an index or key into the cable mapping table to determine one or more cables 108 that are expected to be connected to the port.

In one embodiment, the first indicator module 306 is configured to trigger a visual indicator 110 at the port of the first node 106 to visually confirm that the cable 108 is the expected cable 108 for the port of the first node 106. The visual indicator 110 may include an LED at the port that the first indicator module 306 triggers, causes, signals, or the like to blink at a predetermined rate (e.g., 1 Hz for a successful connection, 2 Hz for an incorrect connection), blink at a predetermined rate for a predetermined period of time (e.g., 2 Hz for 5 seconds for a successful connection, 1 Hz for 3 seconds for an incorrect connection), stay lit for a predetermined period of time, turn off, emit a color associated with the success or failure of the connection (e.g., green for the expected cable 108, red for the incorrect cable 108), and/or the like. The visual indicator 110, in some embodiments, may include a display that can present messages (e.g., "success", "correct", "incorrect", "error", or the like), a plurality of LEDs, and/or other types of visual indicators.

In certain embodiments, the first indicator module 306 triggers a visual indicator 110 at the port of the first node 106 to indicate that the first end of the cable 108 is not expected to be installed in the port of the first node 106 according to the cable mapping table in response to the first end of the cable 108 being installed in the port of the first node 106. In other words, the first indicator module 306 triggers a visual indicator 110 at the port of the first node 106 to indicate that the cable 108 is a correct or expected cable 108 for the port, or to indicate that the cable 108 is not the correct or expected cable 108 for the port.

In one embodiment, if the first port module 304 determines that the cable 108 is not the expected cable 108 to be connected to the current port of the first node 106, the first port module 304 may determine a correct port for the cable 108 (e.g., a port of the first node 106 where the cable 108 is expected to be connected), and cause the first indicator module 306 to trigger a visual indicator at the correct port of the first node 106 where the first end of the cable 108 is expected to be installed.

In one embodiment, the second port module 308 is configured to determine a port of a second node 106 where a second end of the cable 108 is expected to be installed or connected based on the cable mapping table. The second port module 308, for instance, may check the cable mapping table to determine the correct port at the second node 106 where the other end of the cable 108 that is connected to the port at the first node 106 should be installed in response to the first port module 304 confirming that the first end of the cable 108 is installed at a correct port of the first node 106.

In one embodiment, the second indicator module 310 is configured to trigger a visual indicator at the port of the second node 106 that the second port module 308 identified to be the correct port for the second end of the cable 108 to visually indicate that the second end of the cable 108 is expected to be installed at the port of the second node 106. The visual indication 110 may correspond to the visual indication that the first indicator module 310 triggered at the port of the first node 106, and each visual indication at the port of the first node 106 and the port of the second node 106 may be lit at the same time. Once the second end of the cable 108 is connected to the port of the second node 106, the first and second indicator modules 306, 310 may provide a final visual confirmation such as blinking an LED three times simultaneously at the ports of the first and second nodes 106 where the cable 108 is connected.

As with the first indicator module 306, the second indicator module 310 triggers a visual indicator 110 at the port of the second node 106 to indicate that the second end of the cable 108 is not expected to be installed in the port of the second node 106 according to the cable mapping table in response to the second end of the cable 108 being installed in the port of the second node 106. In other words, the second indicator module 310 triggers a visual indicator 110 at the port of the second node 106 to indicate that the cable 108 is a correct or expected cable 108 for the port, or to indicate that the cable 108 is not the correct or expected cable 108 for the port.

Furthermore, in one embodiment, if the second port module 308 determines that the cable 108 is not the expected cable 108 to be connected to the current port of the second node 106, the second port module 308 may determine a correct port for the cable 108 (e.g., a port of the second node 106 where the cable 108 is expected to be connected), and cause the second indicator module 310 to trigger a visual indicator at the correct port of the second node 106 where the second end of the cable 108 is expected to be installed.

In one example embodiment, suppose a user (service engineer) plugs in one end of multiple cables 108 in ports of a single node 106 leaving the other end of all the cables 108 dangling. The first and second indicator modules 306, 310 may start blinking the LEDs at the both ends of the port of all the cables 108 in a round-robin fashion. For instance, if four cables 108 (A, B, C, D) are plugged in at ports P1, P2, P3, P4 respectively where E1, E2, E3, E4 are the corresponding other dangling ends of these cables 108, the first and second indicator modules 306, 310 may activate LEDs simultaneously at P1-E1 for one second, turn-off P1-E1, turn-on P2-E2 for one second, turn-off P2-E2, turn-on P3-E3 for one second, and so-on. In this manner, a user can connect the other dangling ends of the cables 108 using the visual indicators 110 and without the help of separate documentation.

In one embodiment, the order module 312 is configured to determine an order for installing cables 108 in ports of a first node 106 based on the cable mapping table. In such an embodiment, the cable mapping table further defines a cable installation order for one or more ports of the first node 106 (e.g., the entries in the cable mapping table may be listed in the desired order, the cable mapping table may include a column that includes an order number for each entry, and/or the like). For instance, if a new enclosure 104 is installed in the system 100, the cable mapping table for the new enclosure 104 may define the order in which cables 108 should be connected to the corresponding ports on the nodes 106 of the enclosure 104.

Accordingly, in one embodiment, the port iteration module 314 is configured to iterate over each port of the first node 106 in the order defined in the cable mapping table and trigger the first indicator module 304 to provide a visual indicator 110 at the port to indicate installation of a cable 108 at the port. In such an embodiment, after a cable 108 is connected to the indicated port of the first node 106, the port iteration module 314 triggers the second indicator module 310 to provide a visual indicator 110 at a corresponding port of a second node 106 where the other end of the cable 108 is expected to be installed or connected. In this manner, a user can install or connect cables 108 between nodes 106 in a predefined order and a guided manner using visual feedback and/or direction at the ports where the cables 108 are connected.

For example, the configuration module 316, described below, selects the appropriate preconfigured cable mapping table and the port iteration module 314 walks through the table and skips over cables 108 if the cables 108 are already connected to a correct port. If certain cables 108 are plugged out of order, or plugged into incorrect ports, the first and/or second indicator modules 306, 310 lights up the LED at the ports "solid ON" indicating to the user that those cables 108 are plugged into incorrect ports and should be removed. Once all cables 108 whose LEDs are lit "solid ON" are removed, the port iteration module 314 starts walking through the ports listed in the preconfigured cable mapping table in the order defined by the cable mapping table until it hits the first missing cable 108. The first and/or second indicator modules 306, 310 then triggers the LEDs at the ports of the first and second nodes 106 where the ends of the cable 108 are to be connected to "blink at 1 Hz". Upon plugging the cable 108 ends in at the ports with the blinking LEDs, the first port module 304 and the second port module 308 validate the cable 108, based on the VPD, and trigger the first and second indicator modules 306, 310 to "blink the LEDs at the ports at 2 Hz for 'n' seconds" to provide a successful indication to the user. The port iteration module 314 then moves to the next missing cable 108 in the cable mapping table.

In one embodiment, the cable mapping table is predefined based on the architectures, configurations, or the like of the information handling device 102, the enclosures 104, the nodes 106, or the like, which the configuration module 316 determines based on enclosure presence detection and machine-type-model information. The cable mapping table may be stored in firmware of one or more of the information handling device 102, an enclosure 104, a node 106, a service processor 204, and/or the like. For instance, the cable mapping table may include a cabling order that provides for the easiest, quickest, most efficient, or the like cabling between nodes 106 for the particular configuration of nodes (e.g., a POWERS® architecture, a POWERS® architecture, or the like), which may be stored in firmware or other non-volatile storage of the information handling device 102, of an enclosure 104, of a node 106, or the like.

In one embodiment, the configuration module 316 is configured to dynamically generate the cable mapping table by detecting when cables 108 are first connected to a port of first node 106 and a port of a second node 106. For instance, the configuration module 316 may detect a first end of a cable 108 installed in a port of the first node 106 and a second end of the cable 108 installed in a port of the second node 106, and may create an entry in the cable mapping table that includes (1) a mapping of the port of the first node 106 to the port of the second node 106 and (2) metadata (VPD) for the cable 108 used to connect the port of the first node 106 to the port of the second node 106.

For example, when an enclosure 104 is first installed in the information handling device 102, the configuration module 318 may enter a setup or configuration mode, may be placed in a setup or configuration mode by a user, or the like to monitor and track cable 108 connection locations for the ports of the nodes 106 while cables 108 are connected to the ports. Accordingly, the configuration module 316 may create entries in the cable mapping table with the corresponding cable information and port/node information in real-time while the user connects cables 108 to the ports. Furthermore, the configuration module 316 may track the order in which the cables 108 are connected. The resulting cable mapping table may be exported to a format that can be imported into other systems for reusability such as an extensible markup language ("XML") format, or the like.

In certain embodiments, while the cable mapping table is being dynamically generated, the configuration module 316 detects that an end of a previously-recorded cable mapping is removed from the port of the first node 106 and/or the port of the second node 106 and removes the entry for the cable 108, the port of the first node, and the port of the second node from the cable mapping table. Thus, in this manner, if a user makes a mistake in the initial cabling, re-arranges the cabling, or the like, the configuration module 316 can update the cable mapping table on the fly.

In one embodiment, the cable removal module 318 is configured to initially scan each port of the first node 106 and each port of the second node 106 to determine if any cables 108 are incorrectly installed in an unexpected port according to the cable mapping table, and if so, provides a visual indicator 110 at the port of a node 106 where an end of the cable 108 is incorrectly installed to indicate removal of the end of the cable 108 from the port. When the incorrectly connected cable 108 is removed, in certain embodiments, the cable removal module 318 clears the visual indicator 110 at the port of the node 106 that the cable 108 is removed from.

Figure 4:
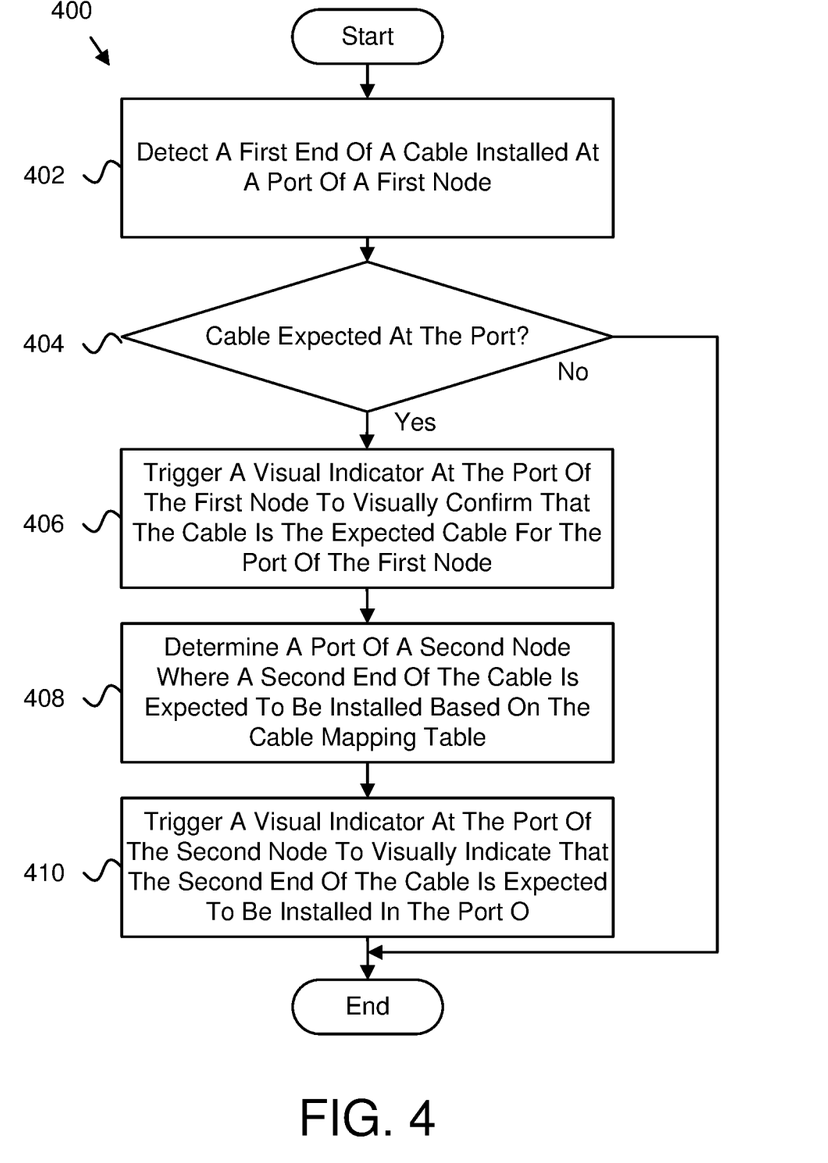
FIG. 4 is a schematic flow chart diagram illustrating one embodiment of a method for guided cable management.

FIG. 4 is a schematic flow chart diagram illustrating one embodiment of a method 400 for guided cable management. In one embodiment, the method 400 begins and detects 402 a first end of a cable 108 installed at a port of a first node 106. In further embodiments, the method 400 determines 404 whether the cable 108 that is installed at the port of the first node 106 is an expected cable 108 for the port of the first node 106 based on a cable mapping table.

If the cable 108 is an expected cable 108, in some embodiments, the method 400 triggers 406 a visual indicator at the port of the first node 106 to visually confirm that the cable 108 is the expected cable 108 for the port of the first node 106. Otherwise, the method 400 ends. In further embodiments, the method 400 determines 408 a port of a second node 106 where a second end of the cable 108 is expected to be installed based on the cable mapping table. In one embodiment, the method 400 triggers 410 a visual indicator at the port of the second node 106 to visually indicate that the second end of the cable 108 is expected to be installed in the port of the second node 106, and the method 400 ends.

Figure 5:
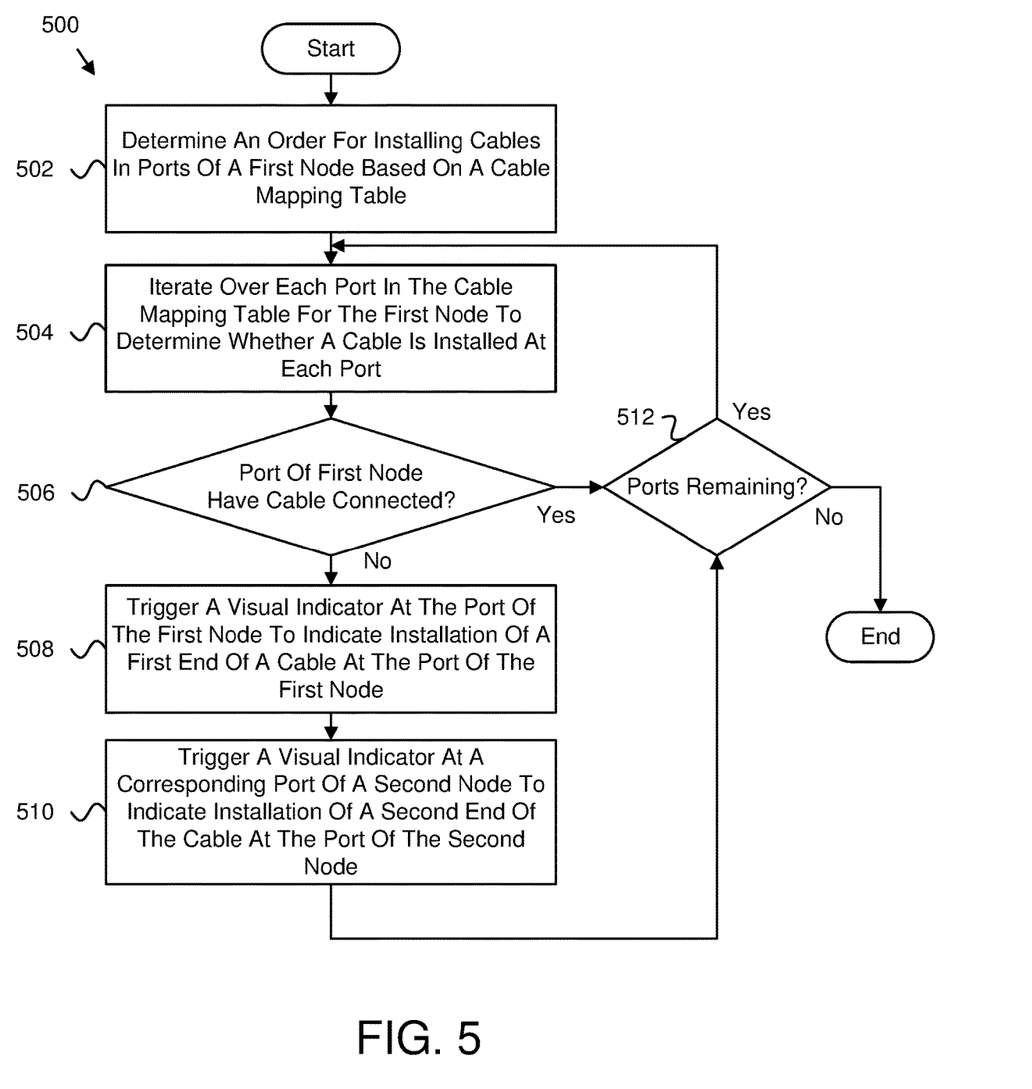
FIG. 5 is a schematic flow chart diagram illustrating one embodiment of another method for guided cable management.

FIG. 5 is a schematic flow chart diagram illustrating one embodiment of another method 500 for guided cable management. In one embodiment, the method 500 begins and determines 502 an order for installing cables 108 in ports of a first node 106 based on a cable mapping table. In some embodiments, the method 500 iterates 504 over each port in the cable mapping table for the first node 106 to determine whether a cable 108 is installed at each port.

If the method 500 determines 506 that a port of the first node 106 does not have a cable 108 connected, the method 500 triggers 508 a visual indicator at the port of the first node 106 to indicate installation of a first end of a cable 108 at the port of the first node 106. The method 500, in further embodiments, triggers 510 a visual indicator at a corresponding port of a second node 106 to indicate installation of a second end of the cable 108 at the port of the second node 106. The method 500 determines 512 whether there are any ports remaining to check for the first node 106. If so, the method 500 moves to the next port to determine 506 if the port as a cable 108 installed. Otherwise, the method 500 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a cable module that detects a first end of a cable installed at a port of a first node, the first end of the cable storing metadata for the cable;
   a first port module that determines whether the cable that is installed at the port of the first node is an expected cable for the port of the first node based on a cable mapping table, the cable metadata used to reference the cable mapping table;
   a first indicator module that, in response to determining the cable is the expected cable at the port of the first node, triggers a visual indicator at the port of the first node to visually confirm that the cable is the expected cable for the port of the first node;
   a second port module that determines a port of a second node where a second end of the cable is expected to be installed based on the cable mapping table; and
   a second indicator module that triggers a visual indicator at the port of the second node to visually indicate that the second end of the cable is expected to be installed in the port of the second node,
   wherein at least a portion of said modules comprise one or more of hardware circuits, programmable hardware devices and executable code, the executable code stored on one or more computer readable storage media.

2. The apparatus of claim 1, further comprising:
   an order module that determines an order for installing cables in ports of a first node based on the cable mapping table, the cable mapping table further defining a cable installation order for one or more ports of the first node; and
   a port iteration module that iterates over each port in the cable mapping table for the first node to determine whether a cable is installed at each port,
   wherein, in response to determining a port of the first node does not have a connected cable:
   the first indicator module triggers a visual indicator at the port of the first node to indicate installation of a first end of a cable at the port of the first node; and
   the second indicator module triggers a visual indicator at a corresponding port of a second node to indicate installation of a second end of the cable at the port of the second node.

3. The apparatus of claim 2, wherein the second indicator module triggers the visual indicator at the port of the second node in response to detecting the first end of the cable is installed at the first port of the first node.

4. The apparatus of claim 2, further comprising a cable removal module that:
   initially scans each port of the first node and the second node to determine if any cables are incorrectly installed in an unexpected port according to the cable mapping table;
   provides a visual indicator at the port of a node where an end of the cable is incorrectly installed to indicate removal of the end of the cable from the port; and
   clears the visual indicator at the port in response to removal of the end of the cable from the port.

5. The apparatus of claim 1, wherein the cable mapping table is predefined based on architectures of the first and second nodes, the cable mapping table stored in firmware of one or more of the first and second nodes.

6. The apparatus of claim 1, further comprising a configuration module that dynamically generates the cable mapping table by:
   for each corresponding port of the first and second nodes:
      detecting a first end of a cable installed in a port of the first node and a second end of the cable installed in a port of the second node; and
      creating an entry in the cable mapping table comprising a mapping of the port of the first node to the port of the second node and metadata for the cable used to connect the port of the first node to the port of the second node.

7. The apparatus of claim 6, wherein the configuration module further tracks and stores, in the cable mapping table, an order that each cable is installed between the port of the first node and the port of the second node.

8. The apparatus of claim 6, wherein the configuration module, while the cable mapping table is generated, further:
   detects that an end of a previously-recorded cable mapping is removed from one of the port of the first node and the port of the second node; and
   removes the entry for the cable, the port of the first node, and the port of the second node from the cable mapping table.

9. The apparatus of claim 1, wherein, one or more of:
   the first indicator module triggers a visual indicator at the port of the first node to indicate that the first end of the cable is not expected to be installed in the port of the first node according to the cable mapping table in response to the first end of the cable being installed in the port of the first node; and
   the second indicator module triggers a visual indicator at the port of the second node to indicate that the second end of the cable is not expected to be installed in the port of the second node according to the cable mapping table in response to the second end of the cable being installed in the port of the second node.

10. The apparatus of claim 9, wherein:
    in response to determining that the first end of the cable is not expected to be installed in the port of the first node, the first indicator module triggers a visual indicator at a different port of the first node where the first end of the cable is expected to be installed; and in response to determining that the second end of the cable is not expected to be installed in the port of the second node, the second indicator module triggers a visual indicator at a different port of the second node where the second end of the cable is expected to be installed.

11. The apparatus of claim 1, wherein the cable module is configured to detect cables installed in ports of the first node and ports of the second node one or more of in response to an interrupt, at startup of the first and second nodes, and in response to a user manually starting cable detection using an interface for the first and second nodes.

12. The apparatus of claim 1, wherein the visual indicator comprises a light associated with a port, the light configured to one or more of blink at a predefined rate, stay on for a predetermined period of time, turn off, and emit a predefined color according to whether an end of the cable is installed in an expected port of the first and second nodes.

13. The apparatus of claim 1, wherein the cable comprises a symmetric multi-processing ("SMP") cable and the ports of the first and second nodes comprise symmetric multi-processing ports, the SMP cable used to connect the first node to the second node to facilitate communications between different processors of the first and second nodes.

14. The apparatus of claim 1, wherein the cable metadata comprises vital product data ("VPD") for the cable, the VPD comprising one or more of a cable identifier, a cable length, and a cable type.

15. A method, comprising:
    detecting a first end of a cable installed at a port of a first node, the first end of the cable storing metadata for the cable;
    determining whether the cable that is installed at the port of the first node is an expected cable for the port of the first node based on a cable mapping table, the cable metadata used to reference the cable mapping table;
    triggering, in response to determining the cable is the expected cable at the port of the first node, a visual indicator at the port of the first node to visually confirm that the cable is the expected cable for the port of the first node;
    determining a port of a second node where a second end of the cable is expected to be installed based on the cable mapping table; and
    triggering a visual indicator at the port of the second node to visually indicate that the second end of the cable is expected to be installed in the port of the second node.

16. The method of claim 15, further comprising:
    determining an order for installing cables in ports of a first node based on the cable mapping table, the cable mapping table further defining a cable installation order for one or more ports of the first node;
    iterating over each port in the cable mapping table for the first node to determine whether a cable is installed at each port; and
    in response to determining a port of the first node does not have a connected cable:
        triggering a visual indicator at the port of the first node to indicate installation of a first end of a cable at the port of the first node; and
        triggering a visual indicator at a corresponding port of a second node to indicate installation of a second end of the cable at the port of the second node.

17. The method of claim 16, further comprising triggering the visual indicator at the port of the second node in response to detecting the first end of the cable is installed at the first port of the first node.

18. The method of claim 16, further comprising:
    initially scanning each port of the first node and the second node to determine if any cables are incorrectly installed in an unexpected port according to the cable mapping table;
    providing a visual indicator at the port of a node where an end of the cable is incorrectly installed to indicate removal of the end of the cable from the port; and
    clearing the visual indicator at the port in response to removal of the end of the cable from the port.

19. The method of claim 15, further comprising dynamically generating the cable mapping table by:
    for each corresponding port of the first and second nodes:
        detecting a first end of a cable installed in a port of the first node and a second end of the cable installed in a port of the second node; and
        creating an entry in the cable mapping table comprising a mapping of the port of the first node to the port of the second node and metadata for the cable used to connect the port of the first node to the port of the second node.

20. A computer program product for guided cable management, the computer program product comprising a computer readable storage medium having program instructions embodied therewith, the program instructions executable by a processor to cause the processor to:
    detect, by processor, a first end of a cable installed at a port of a first node, the first end of the cable storing metadata for the cable;
    determine, by processor, whether the cable that is installed at the port of the first node is an expected cable for the port of the first node based on a cable mapping table, the cable metadata used to reference the cable mapping table;
    trigger, by processor and in response to determining the cable is the expected cable at the port of the first node, a visual indicator at the port of the first node to visually confirm that the cable is the expected cable for the port of the first node;
    determine, by processor, a port of a second node where a second end of the cable is expected to be installed based on the cable mapping table; and
    trigger, by processor, a visual indicator at the port of the second node to visually indicate that the second end of the cable is expected to be installed in the port of the second node.

* * * * *